UNITED STATES PATENT OFFICE.

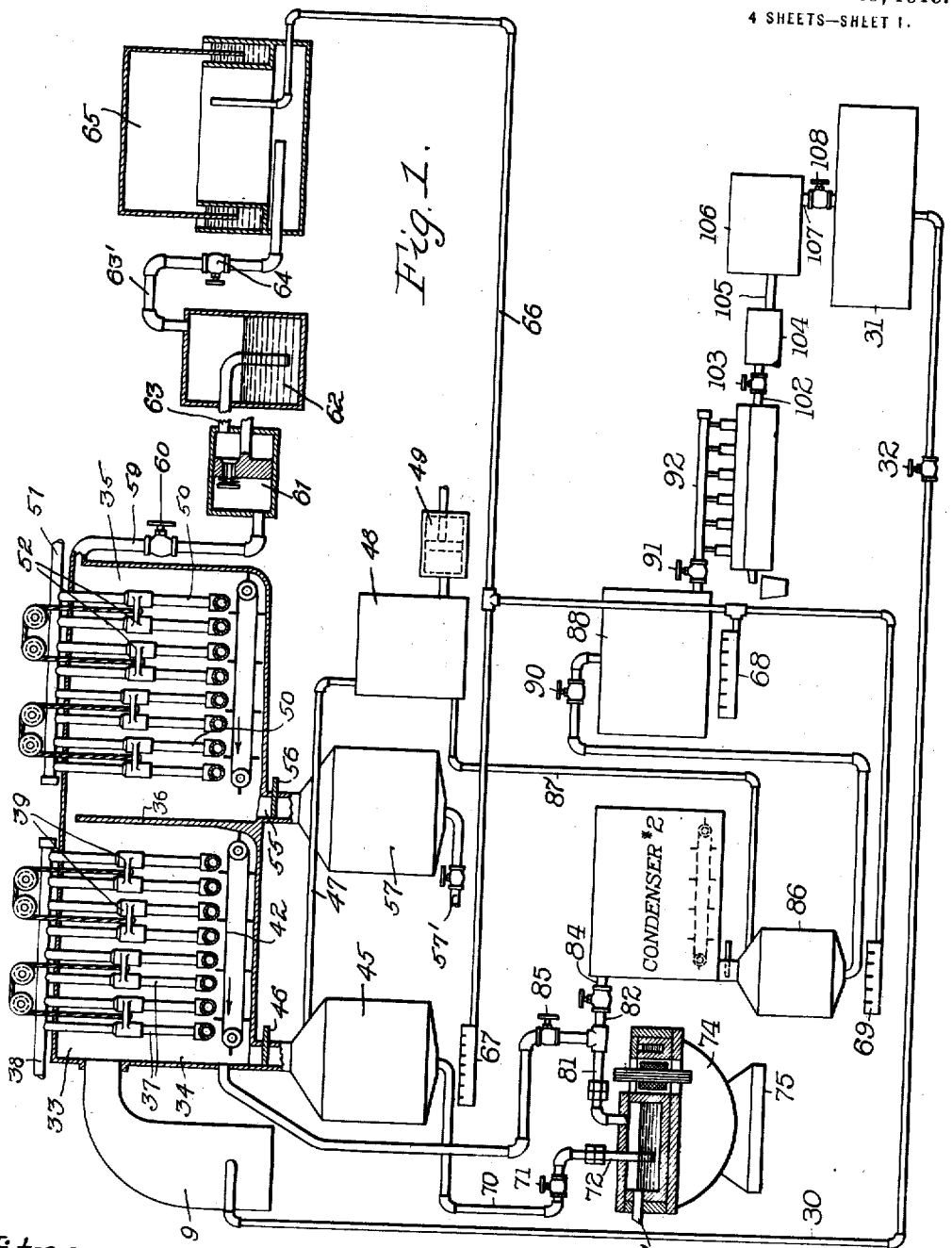

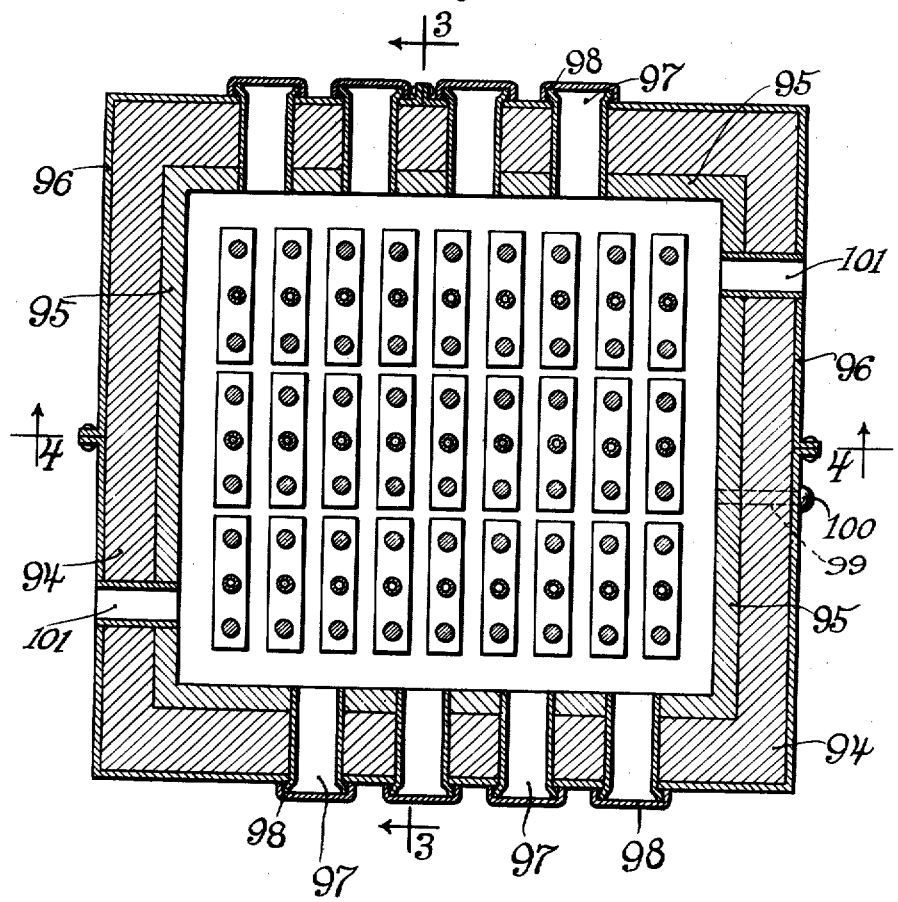

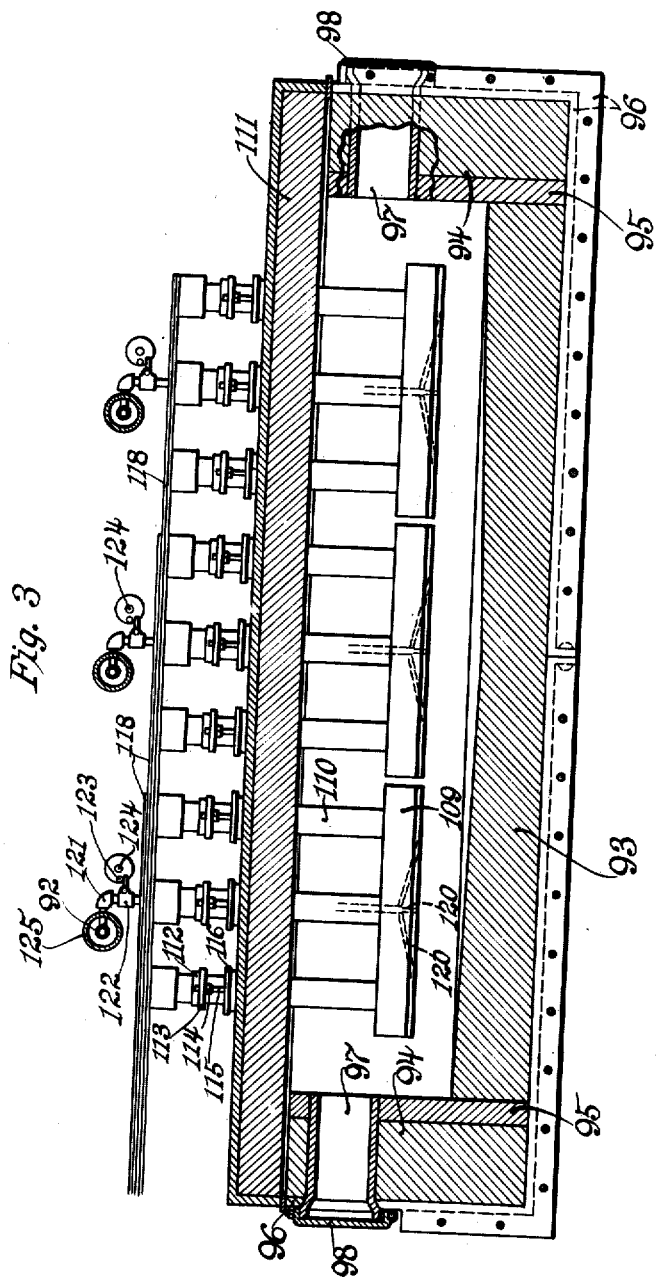

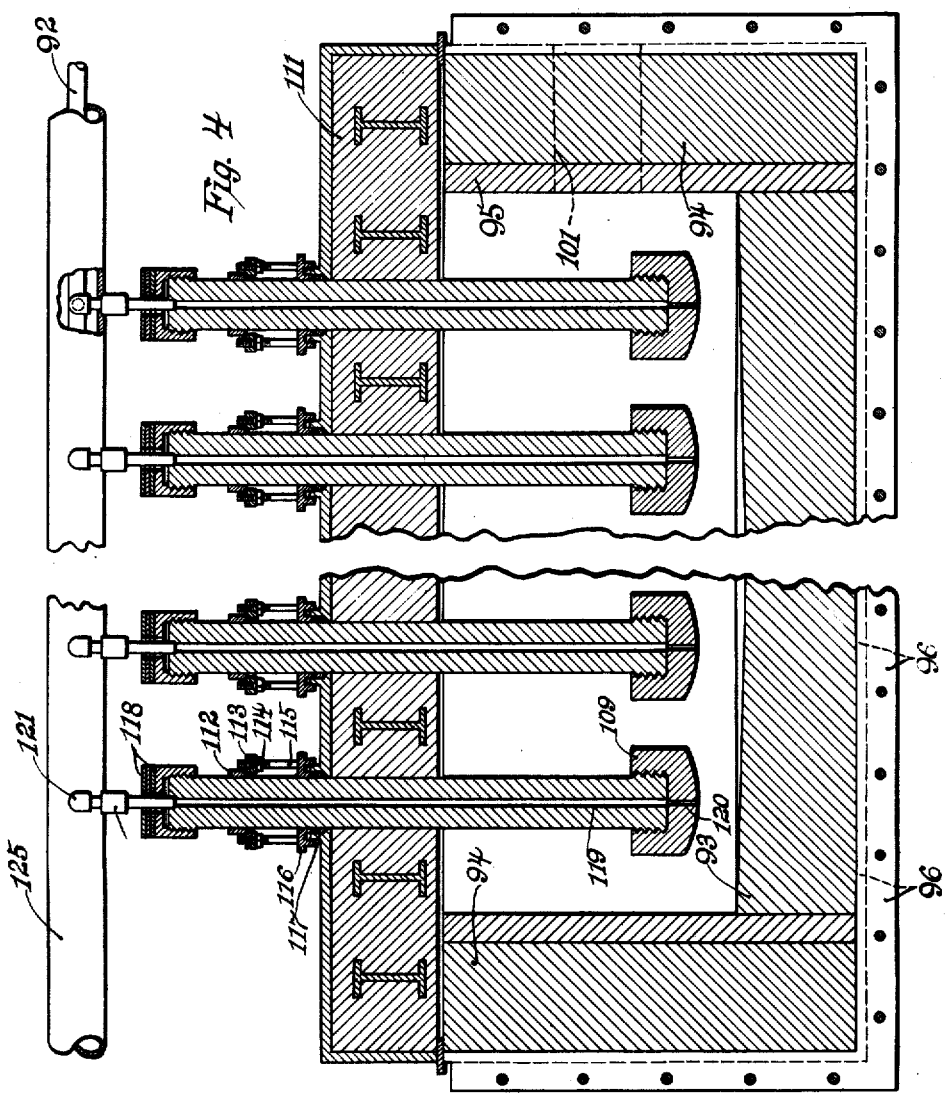

VICTOR M. WEAVER, OF HARRISBURG, PENNSYLVANIA, ASSIGNOR TO WEAVER COMPANY, A CORPORATION OF WISCONSIN.

PROCESS FOR SECURING METALS FROM THEIR COMPOUNDS.

1,297,946.  Specification of Letters Patent.  Patented Mar. 18, 1919.

Original application filed August 22, 1914, Serial No. 858,001. Divided and this application filed January 11, 1915. Serial No. 1,559.

*To all whom it may concern:*

Be it known that I, VICTOR M. WEAVER, a citizen of the United States, residing at Harrisburg, in the county of Dauphin and State of Pennsylvania, have invented a certain new and useful Improvement in Processes for Securing Metals from Their Compounds, of which the following is a full, clear, concise, and exact description, reference being had to the accompanying drawings, forming a part of this specification.

My invention relates to a process for securing metals from their compounds. While it will appear to those skilled in the art that my invention may be employed in the treatment of any substances having the proper chemical and physical characteristics, my invention is concerned particularly with the securing of aluminum from aluminum chlorid, as pointed out in the more specific of the appended claims.

This application is divisional from the application which resulted in my United States Letters Patent No. 1,238,604, which issued August 28, 1917, and which is concerned with a process for winning metals and which, in its more specific aspects, relates to the treatment of clay in order to secure the aluminum and the silicon therefrom.

The claims in the parent patent are drawn toward the process as a whole, that is, the complete process, beginning with clay and the proper reagents, and ending with the recovery of the aluminum and silicon in their elementary state.

The present application has to do with the securing of the aluminum from the aluminum chlorid, all in a new and advantageous manner.

In order to instruct those skilled in the art I shall now proceed with a specific description of my invention as embodied in my process of securing aluminum and silicon from clay, and shall refer to and describe the various parts of the apparatus and the various stages in the process in detail, in order that I may make a complete and intelligent disclosure.

In the treatment of clay, I break up the compound by the use of chlorin gas so as to produce aluminum chlorid and silicon tetrachlorid, this action being carried on under special restrictions and conditions, as will later be more fully described. With the aluminum chlorid thus produced, the next step, so far as this particular part of the process is concerned, is to secure the aluminum therefrom and this I carry out by electrolysis under certain conditions and restrictions calculated to effect an advantageous and continuous process. I charge the aluminum chlorid into an electrolyzing vat, preferably containing melted sodium chlorid, and the consequent electrolysis separates the aluminum from the chlorin, so that the former may be tapped away from the sodium chlorid, while the latter may be conducted to a storage tank for further use. It is important in this connection that in carrying out my process I keep the electrolytic vat saturated by steady, regulated additions of aluminum chlorid, and this proves to be a feature of distinct advantage and paramount importance.

My invention will be more readily understood by reference to the accompanying drawings, in which:

Figure 1 is a more or less diagrammatic representation of the entire system of apparatus.

Fig. 2 is a sectional view, taken on a horizontal plane, of the electrolyzing vat.

Figs. 3 and 4 are other sectional views.

Referring first to Fig. 1, it will be seen that the chlorinizing furnace is shown at 9. The details of this furnace are unimportant in connection with the present application and it suffices to say that a charge is introduced into the chlorinizing furnace, which is preferably heated by electrical means. A pipe 30, which comes from a storage tank 31, is led into the chlorinizing furnace, as indicated in the drawing, and in this way the charge in the furnace is treated with chlorin gas from the storage tank 31, the connection being controlled by a valve 32. Assuming that the charge in the furnace is of one of the higher grades of clay, such as kaolin, I treat this charge with the chlorin gas in the presence of carbon. With the current properly applied to the furnace electrodes, the activity of the chlorin gas and the heat immediately effects the disintegration of the kaolin, the formation of aluminum chlorid and silicon tetrachlorid, and, by the combination of the carbon and the oxygen liberated from the kaolin, the formation of carbon monoxid.

The three gases thus formed naturally arise and pass out of the chlorinizing furnace 9 and are conducted to a condenser 33. This condenser is in the form of a double closed chamber providing the compartment 34 and the compartment 35, separated by a partition 36. The compartment 34 is provided with a system of cooling pipes 37, 37, which extend downwardly through and from the top of the chamber and which are distributed throughout the entire space of this particular compartment in order to get a complete temperature control. The pipes 37, 37 are joined at the upper end, outside of the chamber, by means of the header pipe 38, and circulation is secured in any desirable manner. In this particular condenser element the system of pipes is connected to a cold water supply and the result is that as the three gases which have been referred to enter and pass through the compartment 34 the aluminum chlorid gas, which condenses at a higher temperature than the silicon tetrachlorid gas, is condensed and deposits itself as a white powder upon the pipes 37, 37.

Since the temperature which is produced by the circulation of mere cold water in the cooling pipes 37, 37 is not sufficiently low to condense silicon tetrachlorid, this gas, together with the carbon monoxid, passes on to the next compartment 35 of the condenser. Thus the first condenser element 34 is devoted to the condensation of the aluminum chlorid, and the white powder to which it is reduced is removed from the pipes upon which it is deposited by means of the scrapers 39, 39. The powder is thus thrown down on the conveyer 42 and carried to a tank 45, the connection to which is controlled by a valve 46. It will be seen that this tank is connected by means of a pipe 47, with a compressed air tank 48, which is fed through the air-compressor 49. It is important, as before indicated, that the system be a closed system and that various actions be carried on under pressure, and I speak of it particularly at this time because of the fact that the aluminum chlorid to which I have just referred is extremely deliquescent and must be kept free from moisture in order to avoid decomposition, and the formation of hydrochloric acid. When the system is closed, however, such a result is not possible, and the inclosure is effective in condensing and keeping condensed this volatile substance.

Leaving the aluminum chlorid, which has been deposited in the tank 45, for the present, I shall follow the course of the silicon tetrachlorid gas and the carbon monoxid through the second element of the condenser. The condenser element 35 is provided with a system of cooling pipes 50 like the pipes 37, these pipes having the outside header 51 and being provided with scrapers 52, 52. Instead of being supplied with mere cold water, however, the cooling pipes 50 are supplied with a freezing mixture of ice water and salt, and the temperature in the condenser element 35 is therefore considerably lower than the temperature in the condenser element 34. The lower temperature is sufficient to condense the silicon tetrachlorid, which comes down as a colorless liquid, except for any impurities which may discolor it. This liquid silicon tetrachlorid passes down the sloping bottom of the condenser element 35 and passes through the outlet 55, controlled by the valve 56, which leads to the tank 57. The tank 57 has an outlet pipe $57^1$.

The carbon monoxid passes out of the condenser element 35 through a pipe 59, past a valve 60, into a closed gas pump 61, and is then carried to a scrubber 62 by means of a pipe 63, this scrubber being in the form of a tank containing lime water and having an outlet pipe $63^1$ leading therefrom. This outlet pipe is provided with a valve 64 and leads to a telescoping gas tank 65, so that pressure may be kept upon the carbon monoxid which finds its way to this tank, and so that the carbon monoxid may be fed by way of a pipe 66 to any number of burners 67, 68 and 69, which are used for heating purposes in certain other steps of the process which will hereinafter be referred to.

Returning now to the aluminum chlorid which has been deposited in the form of a powder in the tank 45 (this powder being white unless discolored by impurities) it will be noted that I have placed the burner 67 under this tank, and I may mention here that I surround the tank with a suitable fire wall so that I can subject the tank to a high degree of heat. With the valve 46 closed, the material in the tank 45 can be placed under high pressure from the tank 48, and this pressure, together with the heat from the carbon monoxid burner, melts the aluminum chlorid, after which step the aluminum chlorid is much more stable and much more easily handled, due to its physical condition, and desirably so in view of the steps which are to follow and which will presently be described. I desire to state, however, that it is entirely feasible to conduct the aluminum chlorid to the farther parts of the system in its dry, infused state, and I therefore do not wish to be limited to the inclusion of this step of melting the aluminum chlorid.

A pipe 70 leads from the tank 45 to a valve 71, which in turn is connected with a pipe 72 leading into a furnace, preferably of the Rodenhauser three-phase type. This furnace comprises a heavy outer housing which is provided with a round bottom 74 mounted in a correspondingly shaped base 75, the idea being that when the connecting pipes are temporarily detached, the furnace can be tilted in order to tap off molten metal, as will be pointed out a little later. The lining of the furnace provides a cavity for the molten metal which is formed between and around tubular casing parts within which the magnetic circuit frame and the primary coils are disposed. The details of this furnace do not constitute part of my present invention, but I refer to them because it is a type of furnace well adapted for use as part of my system. It will be seen that when the valve 71 is opened the liquid aluminum chlorid is conducted to the working chamber of the Rodenhauser furnace. The reason for this step in the process is as follows:

In the first condensation of the aluminum chlorid in the condenser element 34, there are likely to be impurities, principally iron, and it is the object of the step in the process now under description to eliminate this iron and to secure pure aluminum chlorid. Therefore, preliminarily, the Rodenhauser furnace is charged with aluminum, and the molten bath, as illustrated, is formed when as before stated, the valve 71 is opened and the liquid aluminum chlorid is fed into this bath of molten aluminum near the bottom thereof, the aluminum chlorid is immediately reconverted into a gas due to the release of pressure and heat of bath, and passes up through the molten aluminum. Due to the greater affinity of the chlorid for the aluminum than for the iron, or other impurity for that matter, the chlorin releases the iron and takes on the proper share of aluminum. The result is that the refined aluminum chlorid will leave the bath of aluminum and will pass out of the furnace through the pipe 81. It will be noted that the pipe 81 divides into the pipes 82 and 83, which are provided with valves 84 and 85, respectively. If the refined aluminum chlorid is to be further purified, the valve 84 is kept closed and the valve 85 is opened, so that the aluminum chlorid gas may pass up the pipe 83 and be passed back into the condenser element 34 for condensation purposes, and in its refined state it will be recharged into the Rodenhauser furnace, as has been described, and this process may be repeated until the required degree of purity has been attained. At this point the valve 85 is closed and the valve 84 is opened, so that the substantially pure aluminum chlorid may be passed into what may be termed "Condenser #2", as indicated. This condenser is of the same structure as the condenser element 34, and the condensed aluminum chlorid in the form of a white powder is brought down into the tank 86. In this tank 86 the aluminum chlorid may be put under pressure by way of the pipe 87 leading from the compressed-air tank 48, and may also be subjected to heat from a flame at the burner 69, preferably confined within fire walls. This again melts the aluminum chlorid, which may then be conducted to a storage tank 88 through a pipe 89 controlled by a valve 90, the pure aluminum chlorid being heated by a carbon monoxid flame at the burner 68 so as to be kept in a liquid condition.

From this storage tank 38 the liquid aluminum chlorid is conducted through a valve 91 and a pipe 92 to the electrolytic vat, which is also sealed. This liquid condition is maintained by the heat due to the resistance of the bath. The electrolytic vat is illustrated in detail in Figs. 2, 3 and 4 and it will be seen that it comprises a graphite hearth 93 and firebrick surrounding walls 94, 94, with magnesite linings 95, 95, the entire vat being surrounded by sustaining plates 96. Along opposite sides of the vat are access openings 97, 97, which are normally sealed by means of covers 98, 98, and a tap hole 99 is provided for a purpose that will be referred to presently, this tap hole being normally closed by means of the plug 100. A chlorin exit 101 is provided, and, as indicated in Fig. 1, this exit is connected by means of a pipe 102, in which there is a valve 103, with a chlorin compressor 104, which in turn is connected by a pipe 105 with a chlorin cooler 106, these two elements being merely diagrammatically shown. The cooler 106 is connected by means of a pipe 107 with the liquid chlorin tank 31, which has already been referred to, and the connecting pipe 107 is provided with a valve 108.

Returning to the detailed showing of the electrolytic vat, it will be seen from Figs. 3 and 4 particularly, that the anodes are in the form of graphite blocks 109, to each of which three stems 110, 110 are secured, the stems being firmly lodged in a reinforced firebrick seal cover 111. Each of the anodes is provided with a collar 112, which is engaged by a loose collar 113 which may be moved up and down by means of nuts 114 on bolt rods 115 extending upwardly from a packing-box cover 116, which surrounds the anode stem and packs it at 117. By this arrangement the electrode stems may be adjusted vertically so that the proper overall adjustment may be secured within the vat. Copper bus bar 118, 118 connect the tops of the electrode stems 110, and in this way the current is conveyed to the bath, the graphite hearth acting as the opposite electrode. The center one of each set of three anode stems is drilled axially, as indicated at 110, and this bore is connected to distributing passageways 120, 120 in the corresponding graphite block. Each of these bores is connected by means of a pipe 121 with the supply pipe 92, which has been hereinbefore referred to, and a valve 122 is disposed in each pipe 121 and is intermittently operated for feeding purposes by a traveler 123 which is mounted upon a rotating shaft 124. Thus, when the various rotating shafts 124 are put into operation, and, as before stated, the valve 91 is opened to permit the passage of the liquid aluminum chlorid, a constant feed per unit of time is afforded down through the passageways 119 and into the vat.

The liquid aluminum chlorid is kept at a high temperature, about 200 degrees centigrade, and at about a pressure of two and a half atmospheres. The heated material from the storage tank is transmitted through hot-oil baths in pipes 125 which surround the supply pipes 92, and thus it is insured that the aluminum chlorid be fed into the vat at the proper temperature. The electrolyte is a bath of melted sodium chlorid at a high temperature which is primarily induced by external means, but which is maintained by the application of the current, the heat being due to the resistance of the bath. The aluminum chlorid is fed to the bath at such a rate as to keep the bath saturated. The action which takes place in the electrolytic vat separates the aluminum from the chlorin and leaves the sodium chlorid. Due to the difference in specific gravity between the pure aluminum which is thus obtained and the melted sodium chlorid, it is a simple matter to tap off the molten aluminum by removing the plug 100, and in this way the first ultimate object of my process is obtained—the securing of aluminum in its elemental state from clay. Since the action is secured leaving sodium chlorid, the electrolyte may go on indefinitely. The chlorin which is freed is passed to the chlorin compressor 104, then to the cooler and then to the storage tank, where it is drawn from to supply the chloronizing furnace 9, all as hereinbefore described.

It will be seen that the process is uniquely continuous, and that the chlorin which is freed in the electrolytic vat may be used over and over again in the chlorinizing furnace, while the carbon monoxid which is formed by the oxygen liberated from the clay and the coke which is introduced is used for burner purposes. It is important that the system be a closed system, as described, to exclude the moisture and to protect the active chlorids, particularly the aluminum chlorid.

An important feature in the matter of the feed-operation of my system is found in the feeding of the melted aluminum chlorid, or aluminum chlorid in powdered condition for that matter, to the electrolytic vat. It is of importance that the electrolytic bath is fed with the aluminum chlorid in such a way as to keep the bath saturated.

It will be apparent to those skilled in the art that various modifications might be made in this system without departing from the spirit or scope thereof. For instance, one might use a different electrolyte. In heating the pipes which maintain the aluminum chlorid in its melted condition while being fed to the electrolytic bath, it might be better practice in some instances to use electric heating coils than to use an oil bath, and it might be well to heat the aluminum chlorid containers in a manner other than by the carbon monoxid flame. With the closed system which has been described, I have the particular advantage that there is no electrode consumption, and therefore when the electrodes are adjusted they will remain adjusted, and economic service is secured.

Referring to the electrolytic vat, I may mention here that the hearth is the cathode and the graphite blocks constitute the anode, and I may also state that, so far as I have been able to observe, the action of the vat is a reduction process. The aluminum forms globules varying in size from mere specks to considerably larger particles, and they occur near the bottom and finally rest upon the bottom. The conclusion from this would be that they are produced by the electrolysis of the sodium chlorid bath, and the chlorin is liberated and streams away with great rapidity. The aluminum which is thus formed is heavier and settles to the bottom, and the particles of aluminum as formed above the bottom frequently join to form larger particles. As the process continues, the bottom is covered by drops of aluminum, and, as described, is tapped out from the vat.

It is pertinent here to suggest that the method which has been described, as to the securing of aluminum from aluminum chlorid by electrolysis, is applicable in the winning of other metals; for instance, zinc can be secured from zinc chlorid by this process.

While I have already referred to the fact that the broad conception of my invention has to do with the winning of any adaptable metal from any adaptable compound, I desire to point out that my process is particularly useful in the winning of metals from compounds containing these metals and oxygen and in this respect I have particularly in mind bauxite, which, so far as some of the broader features of my invention are concerned, would be regarded as the equivalent of clay. However, I have directed my attention merely to the treatment of clay and the more specific aspects of my invention will be seen to be directed to this end.

The various suggestions of changes and the suggestions as to explanations of the action are presented in closing this description, so that those skilled in the art may be as fully advised as possible, and so that it may be clear that my invention is to be measured in its broader aspects as set forth in the broader of the appended claims, and in its more limited aspects as set forth in the more specific claims.

I claim as new and desire to secure by Letters Patent:

1. The process of securing a metal from its chlorid which comprises feeding the chlorid to a static electrolytic bath of sodium chlorid, and then independently and simultaneously collecting the free chlorin and the metal leaving the electrolytic bath of sodium chlorid.

2. The process of securing aluminum from its chlorid which comprises feeding the chlorid to an electrolytic bath continuously, and then independently and simultaneously collecting the free chlorin and the metal.

3. The process of breaking up a compound by electrolytic action which comprises feeding said compound to an electrolytic bath mechanically at a rate of speed independently calculated to keep the bath saturated.

4. The process of securing aluminum from its chlorid which comprises mechanically feeding the chlorid to an electrolytic bath at a rate of speed calculated to keep the bath saturated.

5. The process of securing aluminum from its chlorid which comprises feeding the chlorid to an electrolytic bath of sodium chlorid, the aluminum being maintained in molten condition by the heat due to the resistance of the bath.

6. The process of securing aluminum from its chlorid, which comprises mechanically feeding the chlorid to an electrolytic bath of sodium chlorid at a rate of speed calculated to keep the bath saturated.

7. The process of breaking up a compound by electrolytic action which comprises feeding said compound to an electrolytic bath at a rate of speed calculated to keep the bath saturated and by a plurality of paths to keep the bath uniformly saturated throughout.

8. The process of securing a metal from its chlorid which comprises mechanically feeding the chlorid to an electrolytic bath at a rate of speed calculated to keep the bath saturated.

9. The process of securing aluminum from its chlorid which comprises feeding said chlorid to an electrolytic bath at a rate of speed calculated to keep the bath saturated and by a plurality of paths to keep the bath uniformly saturated throughout.

10. The process of securing aluminum from its chlorid which comprises mechanically feeding said chlorid to an electrolytic bath at a rate of speed calculated to keep the bath saturated and by a plurality of paths to keep the bath uniformly saturated throughout.

11. The process of breaking up a compound by electrolytic action which comprises feeding said compound to an electrolytic bath by a plurality of paths in uniform relation to a plurality of electrodes.

12. The process of breaking up a compound by electrolytic action which comprises force-feeding said compound into said bath by way of a plurality of distributing paths.

13. The process of securing aluminum from its chlorid which comprises feeding the aluminum chlorid to an electrolytic bath, collecting the aluminum and chlorin, and carrying on the operation in a moisture free atmosphere.

14. The process of breaking up a compound by electrolytic action which comprises mechanically feeding said compound to an electrolytic bath at a rate of speed independently calculated to maintain a definite quantitative relation between the bath and the compound.

15. The process of securing a metal from its chlorid which comprises mechanically feeding the chlorid to an electrolytic bath at a rate of speed independently calculated to maintain a definite quantitative relation between the bath and the chlorid.

16. The process of securing aluminum from its chlorid which comprises mechanically feeding the chlorid to an electrolytic bath at a rate of speed independently calculated to maintain a definite quantitative relation between the bath and the chlorid.

17. The process of securing a metal from its chlorid which comprises mechanically feeding the chlorid to an electrolytic bath of fused sodium chlorid at a rate of speed independently calculated to maintain a definite quantitative relation between the bath and the chlorid, 18. The process of securing a metal from a compound by electrolytic action which comprises mechanically feeding said compound to an electrolytic bath at a rate of speed independently calculated to maintain a definite quantitative relation between the bath and the compound.

19. The process of securing a metal from a compound with a halogen by electrolytic action which comprises mechanically feeding said compound to an electrolytic bath at a rate of speed independently calculated to maintain a definite quantitative relation between the bath and the compound.

20. The process of securing a metal from its compound with a halogen which comprises feeding the compound to an electrolytic bath continuously and then independently and simultaneously collecting the free halogen and the metal.

21. The process of breaking up a compound by electrolytic action which comprises feeding said compound to a fused electrolytic bath in definite quantities per unit of time to maintain a definite quantitative relation between the bath and the compound, and maintaining the bath in a fused state by the heating effect of the electric current.

22. The process of securing a metal from its chlorid which comprises mechanically feeding it to an electrolytic bath of the chlorid of a metal more electro-positive than the desired metal at a rate of speed calculated to maintain the electrolyte so supplied with the less electro-positive metal that only that metal will be deposited.

23. The process of breaking up a compound by electrolytic action which comprises feeding said compound to an electrolytic bath in definite quantities per unit of time to maintain a definite quantitative relation between the bath and the compound.

24. The process of breaking up a compound by electrolytic action which comprises controllably feeding said compound to an electrolytic bath in definite quantities per unit of time to maintain a definite quantitative relation between the bath and the compound.

25. The process of breaking up a compound by electrolytic action which comprises mechanically controlling a feed of said compound to an electrolytic bath in definite quantities per unit of time to maintain a definite quantitative relation between the bath and the compound.

In witness whereof I hereunto subscribe my name this 7th day of January, A. D. 1915.

VICTOR M. WEAVER.

Witnesses:
G. L. CULLMERRY,
J. L. STEWART.

Correction in Letters Patent No. 1,297,946.

It is hereby certified that in Letters Patent No. 1,297,946, granted March 18, 1919, upon the application of Victor M. Weaver, of Harrisburg, Pennsylvania, for an improvement in "Processes for Securing Metals from Their Compounds," an error appears in the printed specification requiring correction as follows: Page 3, line 36, for the word "chlorid" read *chlorin;* and that the said Letters Patent should be read with this correction therein that the same may conform to the record of the case in the Patent Office.

Signed and sealed this 6th day of May, A. D., 1919.

[SEAL.]

R. F. WHITEHEAD,
*Acting Commissioner of Patents.*

Cl 204—20.